(12) United States Patent
Kasheff et al.

(10) Patent No.: US 10,608,960 B2
(45) Date of Patent: Mar. 31, 2020

(54) TECHNIQUES FOR BATCHED BULK PROCESSING

(71) Applicant: Facebook, Inc., Menlo Park, CA (US)

(72) Inventors: Zardosht Kasheff, New York, NY (US); Ron Eizenband, Hoboken, NJ (US); Philippe Vincent Ajoux, San Mateo, CA (US); Gyujin Hwang, Belmont, CA (US)

(73) Assignee: FACEBOOK, INC., Menlo Park, CA (US)

(*) Notice: Subject to any disclaimer, the term of this patent is extended or adjusted under 35 U.S.C. 154(b) by 116 days.

(21) Appl. No.: 15/857,239

(22) Filed: Dec. 28, 2017

(65) Prior Publication Data

US 2019/0207873 A1 Jul. 4, 2019

(51) Int. Cl.
| G06F 13/14 | (2006.01) |
| H04L 12/861 | (2013.01) |
| H04L 12/58 | (2006.01) |
| H04L 29/08 | (2006.01) |
| H04L 29/06 | (2006.01) |

(52) U.S. Cl.
CPC .......... *H04L 49/90* (2013.01); *H04L 51/04* (2013.01); *H04L 67/02* (2013.01); *H04L 67/04* (2013.01); *H04L 67/306* (2013.01); *H04L 67/42* (2013.01); *H04L 51/32* (2013.01)

(58) Field of Classification Search
CPC ........ H04L 49/90; H04L 51/04; H04L 67/306
See application file for complete search history.

(56) References Cited

U.S. PATENT DOCUMENTS

| 6,058,389 A | 5/2000 | Chandra et al. |
| 7,707,255 B2 | 4/2010 | Satterfield et al. |
| 8,918,372 B1 | 12/2014 | Guo et al. |
| 10,346,217 B1* | 7/2019 | Bray .................... G06F 9/5083 |
| 10,382,380 B1 | 8/2019 | Suzani et al. |
| 2005/0223058 A1 | 10/2005 | Buchheit et al. |
| 2006/0209868 A1* | 9/2006 | Callaghan ............. G06Q 10/00 370/428 |
| 2007/0028293 A1* | 2/2007 | Boerries ............ H04L 67/1095 726/2 |
| 2007/0038711 A1 | 2/2007 | MacBeth et al. |
| 2009/0234924 A1 | 9/2009 | Edelen et al. |
| 2010/0162132 A1 | 6/2010 | Vankamamidi et al. |
| 2011/0231499 A1 | 9/2011 | Stovicek et al. |
| 2013/0165171 A1 | 6/2013 | Pai et al. |
| 2014/0304238 A1 | 10/2014 | Halla-Aho et al. |
| 2014/0372486 A1* | 12/2014 | Bose .................... G06F 9/546 707/792 |

(Continued)

*Primary Examiner* — Andy Ho
*Assistant Examiner* — Abdou K Seye

(57) ABSTRACT

Techniques for batched bulk processing are described. In one embodiment, an apparatus may comprise a client front-end component operative to receive a plurality of messaging deltas at a messaging system; and queue the plurality of messaging deltas through a message queue of the messaging system; a message queue monitoring component operative to monitor the message queue to identify a plurality of batch-operation messaging deltas of the plurality of messaging deltas; and store a plurality of batch-operation instructions in a batch-operation instruction system; and a batch-operation component of the batch-operation instruction system operative to perform the plurality of batch-operation instructions.

20 Claims, 14 Drawing Sheets

(56) References Cited

U.S. PATENT DOCUMENTS

| | | |
|---|---|---|
| 2015/0281196 A1 | 10/2015 | Sharma |
| 2017/0116217 A1 | 4/2017 | Wang et al. |
| 2018/0121298 A1 | 5/2018 | Johnson et al. |
| 2018/0314761 A1* | 11/2018 | Lewin-Eytan .......... H04L 51/04 |
| 2019/0042654 A1* | 2/2019 | Syeda-Mahmood ........................ G06F 16/258 |
| 2019/0182213 A1 | 6/2019 | Saavedra et al. |

* cited by examiner

*600*

Receive an incoming message from a client device at a client front-end component for a messaging system.
*602*

Extract a messaging conversation identifier for a messaging conversation from the incoming message, wherein the messaging conversation identifier uniquely identifies the messaging conversation for the incoming message, wherein the incoming message is one of a plurality of messaging conversation messages for the messaging conversation.
*604*

Store the incoming message in a message storage system based on indexing the incoming message with the messaging conversation identifier.
*606*

```
Receive an incoming message from a client device at a client
front-end component for a messaging system.
662
           |
Extract a message identifier for the incoming message from
the incoming message, wherein the message identifier
uniquely identifies the incoming message.
664
           |
Store the incoming message in a message storage system
based on indexing the incoming message based on the
message identifier.
666
```

TECHNIQUES FOR BATCHED BULK PROCESSING

BACKGROUND

Users may interact with each other in a messaging system, sending messages back and forth to each other in a text-based conversation between two or more users. A user may have a user account associated with them in the messaging system. The user account is an online identity for the user and can be used as a destination for messages directed to the user, and generally for coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for processing messaging conversations. Some embodiments are particularly directed to techniques for message indexing, messaging conversation indexing, batched bulk processing, and message deduplication.

In some embodiments, for example, an apparatus may comprise a client front-end component operative to receive an incoming message from a client device at a client front-end component for a messaging system; and extract a messaging conversation identifier for a messaging conversation from the incoming message, wherein the messaging conversation identifier uniquely identifies the messaging conversation for the incoming message, wherein the incoming message is one of a plurality of messaging conversation messages for the messaging conversation; and a message queue operative to store the incoming message in a message storage system based on indexing the incoming message with the messaging conversation identifier.

In some embodiments, for example, an apparatus may comprise a client front-end component operative to receive a plurality of messaging deltas at a messaging system; and queue the plurality of messaging deltas through a message queue of the messaging system; a message queue monitoring component operative to monitor the message queue to identify a plurality of batch-operation messaging deltas of the plurality of messaging deltas; and store a plurality of batch-operation instructions in a batch-operation instruction system; and a batch-operation component of the batch-operation instruction system operative to perform the plurality of batch-operation instructions.

In some embodiments, for example, an apparatus may comprise a client front-end component operative to receive an incoming message at a messaging system from a messaging client on a client device; extract a deduplication token from the incoming message; store the incoming message in a message queue where examining the deduplication token determines that the incoming message does not duplicate any existing message of the messaging system; and discard the incoming message where examining the deduplication token determines that the incoming message does duplicate an existing message; and a message deduplication component operative to examine the deduplication token to determine whether the incoming message duplicates any existing message of the messaging system.

In some embodiments, for example, an apparatus may comprise a client front-end component operative to receive an incoming message from a client device at a client front-end component for a messaging system; and extract a message identifier for the incoming message from the incoming message, wherein the message identifier uniquely identifies the incoming message; and a message queue operative to store the incoming message in a message storage system based on indexing the incoming message based on the message identifier.

Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6A illustrates an embodiment of a second logic flow for the messaging system of FIG. 1.

FIG. 6D illustrates an embodiment of a fifth logic flow for the messaging system of FIG. 1.

DETAILED DESCRIPTION

Figure 1:
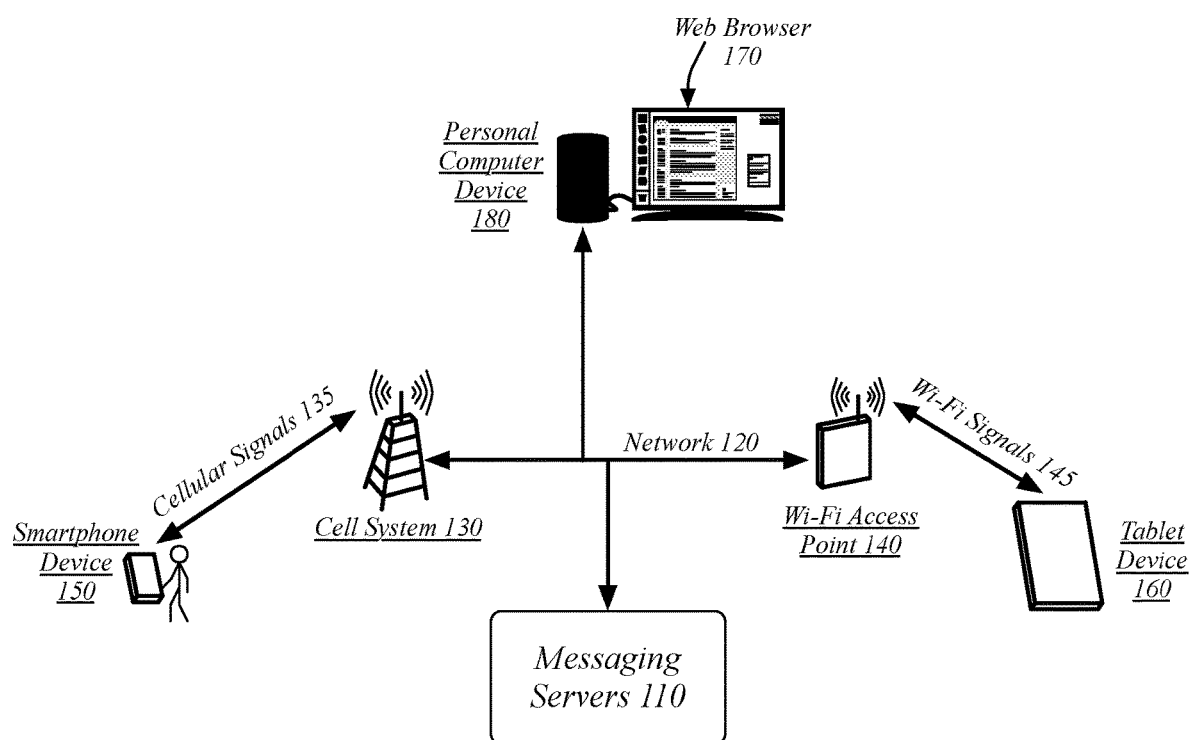
FIG. 1 illustrates an embodiment of a messaging system.

A messaging system receives, distributes, stores, retrieves, and generally processes messages. These operations use processing resources, network resources, storage resources, and generally computational resources. Improvements in the efficiency of these operations may therefore increase the responsiveness of the messaging system for its users, reduce the operating costs of the messaging system for its provider, and generally improve the operation of a messaging system.

A messaging system may organize messages into messaging conversations, where a messaging conversation is a defined series of interactions between users: messages exchanged, media shared, group membership changes (for group messaging conversation), group conversation name assignments, and other message and non-message elements. Each messaging conversation may be assigned a unique messaging conversation identifier. A messaging conversation may be viewed by one or more users as a message thread. A one-on-one messaging conversation may be identified with a canonical form as a sorted tuple of the user identifiers for the two users involved. A group messaging conversation may be identified with an assigned identifier. The conversation identifier may be used across a variety of data stores to retrieve metadata and data related to the conversation: to identify messages sent to and received for the conversation, a single source of truth for the state of the conversation, the retrieval of media items shared in the conversation, and other messaging tasks. The use of this global identifier for a messaging conversation may allow the messaging system to forego translation tables between different identifiers for a messaging conversation and may empower efficient access to messaging conversation information across the entire scope of the messaging system.

Each message exchanged via a messaging system may be assigned a unique message identifier identifying and labelling that message within the domain of the messaging system. Rather than using a random or arbitrary string that is then mapped to message lookup information, the message identifier may be constructed from the pieces of message lookup information used by the messaging system. Specifically, the message identifier may comprise a message timestamp, messaging conversation identifier for the messaging conversation in which the message is included, and a deduplication token used by the messaging system to manage message duplication. The messaging system can decompose the message identifier into the timestamp and messaging conversation identifier to store the message, retrieve the message, retrieve message context, and perform other messaging operations. The message identifier may use a base 64 encoding and be made to be compatible with being passed in a URL.

Various techniques may be employed for delayed processing of bulk data operations in a messaging system. Various operations may use an indefinite amount of time to perform: deleting users, deleting a large number of messaging conversations, and deleting a large number of messages. A message queue is monitored by workers that observe changes, deltas, to the state of the messaging system. The workers may perform actions on the deltas in the message queue. One set of workers watches for deltas that indicate an extensive operation that could take indefinite time to perform that should therefore be batched. Where a messaging conversation is deleted, or older messages in that conversation are deleted, the messaging conversation is marked so that client devices don't display messages to be deleted, and then a record is made for a batch worker to operate on. The batch worker iterates over the records, performing deletes as necessary. Redundant message archiving may also be performed using the delta observer, such that message matching a particular profile are selected for archiving and copied to an archival database. These bulk data operations may be performed with a delay by a system that uses throttling to avoid interfering with operations of the messaging system that more significantly benefit from lower-latency performance.

Various techniques may be used for time-scoped deduplication in a messaging system. There are many circumstances in which partial failure in the sending of a message results in a retry that produces a duplicate message. A messaging system may employ multiple techniques to detect and eliminate duplicates. A messaging client may assign a deduplication token to outgoing messages, this deduplication token containing a client timestamp and a randomly-generated nonce. This token may be compared to the deduplication tokens for received messages to determine if a duplicate has been received. However, checking the deduplication token against all the received tokens could be too computationally expensive. Instead, a message will only be checked for duplication if its timestamp is not the highest timestamp received for that client. Further, a probabilistic data structure, such as a Bloom filter, may be used to track and compare deduplication tokens, allowing efficient comparisons to be performed. The probabilistic data structure provides accurate negative results (i.e., that there is no duplication), but may rarely produce false positives (i.e., falsely indicate that duplication exists). However, the combined rate of actual positives and false positives may be low enough that actual comparisons for the positive results may be performed without overwhelming the deduplication token repository database. To further improve efficiency, timestamps older than a predefined age (e.g., one day, one week) may be completely disallowed, containing the scope of the probabilistic data structure.

These techniques, either by themselves or in combination, may improve the efficiency of a messaging system, increasing responsiveness, reducing operating costs, and generally improving the operation of the messaging system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a messaging system 100. In one embodiment, the messaging system 100 may comprise a computer-implemented system having software applications comprising one or more components. Although the messaging system 100 shown in FIG. 1 has a limited number of elements in a certain topology, it may be appreciated that the messaging system 100 may include more or less elements in alternate topologies as desired for a given implementation.

Messaging servers 110 may comprise one or more messaging servers operated by a messaging platform as part of a messaging system 100. A messaging server may comprise an Internet-accessible server, with the network 120 connecting the various devices of the messaging system 100 comprising, at least in part, the Internet. A messaging system 100 may use the messaging servers 110 to support messaging for various user client devices.

A user may own and operate a smartphone device 150. The smartphone device 150 may comprise an iPhone® device, an Android® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system 100 may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system 100 may be organized into shared spaces known as messaging conversation. A messaging conversation may collect together the messages shared between a particular group of users. Messages sent individually between a pair of users may be collected into a one-on-one messaging conversation uniquely associated with the private messaging between the pair of users. Messages sent between a group of three or more users may not be uniquely defined by their membership, but instead by, in some embodiments, an identifier uniquely identifying the group messaging conversation. Membership in a group messaging conversation may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system 100 may be prevented from decrypting messages being sent between clients. In some embodiments, users can select whether a particular messaging conversation uses end-to-end encryption (and thereby receive the additional privacy of the messaging servers being prevented from accessing the contents of messages) or doesn't (and thereby receive the benefit of the messaging system 100 being able to programmatically access messages for the purpose of offering relevant services to the users).

The messaging system 100 may use knowledge generated from interactions between users. The messaging system 100 may comprise a component of a social-networking system and may use knowledge generated from the broader interactions of the social-networking system. As such, to protect the privacy of the users of the messaging system 100 and the larger social-networking system, messaging system 100 may include an authorization server (or other suitable component (s)) that allows users to opt in to or opt out of having their actions logged by the messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system 100 and other elements of a social-networking system through blocking, data hashing, anonymization, or other suitable techniques as appropriate.

Conversation ID Format and Message ID Encoding

Figure 2:
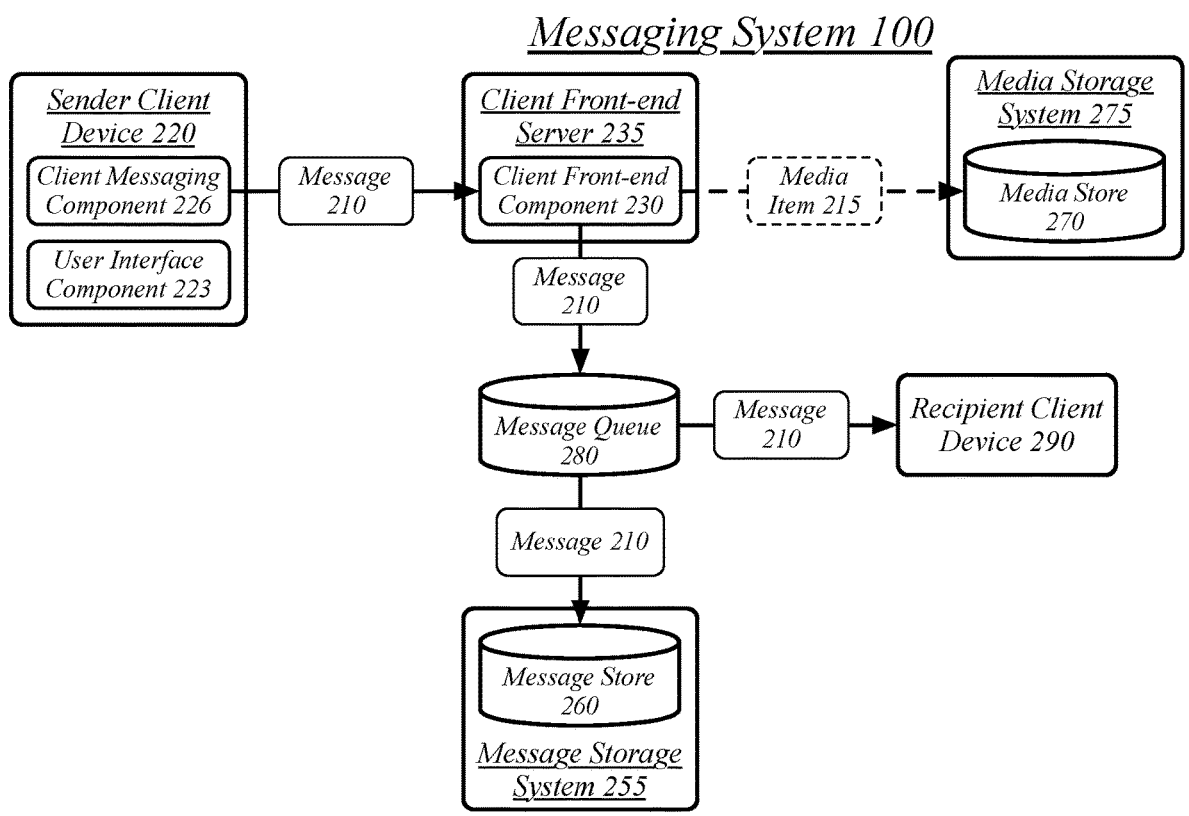
FIG. 2 illustrates an embodiment of a messaging system receiving, distributing, and storing an incoming message.

FIG. 2 illustrates an embodiment of a messaging system 100 receiving, distributing, and storing an incoming message 210.

A messaging system 100 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers through network communication. For example, the messaging client transmitting or receiving messages to or from a client front-end server 235 may be interpreted as using the network interface controller for network access to a communications network for the transmission or reception of information.

A messaging client may comprise a user interface component 223. A user interface component 223 may be generally arranged to display user interfaces to a user of a client device and to receive user commands for the messaging client for the client device. A messaging client may comprise a client messaging component 226. A client messaging component 226 may be generally arranged to conduct messaging interactions on the behalf of the messaging client via communication with the client front-end server 235.

A client front-end server 235 may be generally arranged to act as a network access point to the messaging system 100 for client devices such as sender client device 220. The client front-end server 235 may comprise a client front-end component 230, the client front-end component 230 generally arranged to act as a network access point to messaging services for the messaging system 100. The client front-end component 230 may receive messages from client devices and add the messages to message queues.

A message queue 280 may be specifically associated with the user of sender client device 220, such as by being uniquely associated within the messaging system 100 with a user account for the user of sender client device 220. The message queue 280 may be a single queue used for all messaging endpoints used by this user. The message queue 280 may comprise a representation of updates in a strict linear order. The message queue 280 may be organized as a data unit according to a variety of techniques. The message queue 280 may be stored in semi-persistent memory, persistent storage, both semi-persistent memory and persistent storage, or a combination of the two. The message queue 280 may be organized according to a variety of data structures, including linked lists, arrays, and other techniques for organizing queues. The message queue 280 may generally comprise a first-in-first-out (FIFO) queue in which no update will be removed or retrieved from the queue before any updates that were received prior to it.

A messaging conversation is exchanged via a messaging system 100. This messaging conversation involves at least one client device, such as a sender client device 220 and/or a recipient client device 290. A message 210 may be sent from a client messaging component 226 of a messaging client on a sender client device 220. This message 210 is associated with a messaging conversation, the messaging conversation involving two or more participants, including the user of the sender client device 220. This message 210 comprises a portion of the messaging conversation. Each participant in a messaging conversation has their own perspective on the messaging conversation, which may be represented as a message thread on their respective client device.

The message 210 is received by the client front-end component 230 of the client front-end server 235 and is added to a message queue 280 associated with the sender. The message 210 is distributed using the message queue 280 to the recipient client device 290. The message 210 may also be redistributed back to the sender client device 220 for association with the message conversation and message thread.

The messaging system 100 may comprise a message storage system 255. The message storage system 255 is generally arranged to store the message history for the messaging system 100. The message storage system 255 may store messages exchanged via the messaging system 100. The message storage system 255 may comprise a message store 260 that stores the complete contents of messages, including a message body and any message metadata associated with the message.

A sender client device 220 may generate a message 210 and send the message 210 to the client front-end component 230. The messaging system 100 receives the incoming message 210 from the sender client device 220 at the client front-end component 230 for the messaging system 100.

The client front-end component 230 may extract a message identifier for the incoming message 210 from the incoming message 210. The message identifier uniquely identifies the incoming message 210 within the domain of the messaging system 100. The client front-end component 230 may extract a messaging conversation identifier for a messaging conversation from the incoming message 210. The messaging conversation identifier uniquely identifies the messaging conversation for the incoming message 210, wherein the incoming message 210 is one of a plurality of messaging conversation messages for the messaging conversation. The messaging conversation identifier may comprise an element of the message identifier and be extracted by decomposing it from the message identifier. Alternatively, the messaging conversation identifier may additionally or alternatively directly represented as a distinct metadata field of the message 210.

The message identifier of the message 210 may comprise a base-sixty-four encoded string comprising one or more message identifier elements. The message identifier may comprise a message timestamp for the incoming message, a messaging conversation identifier for a messaging conversation comprising the incoming message 210, and a deduplication token. The use of a base 64 encoded string may reduce the space used to store message identifiers as compared to other encoding techniques, thereby reducing the total storage space used by a message storage system 255, and thereby improve the efficiency of a message system 100.

The messaging conversation identifier may be determined based on whether the messaging conversation is a one-to-one messaging conversation or a group messaging conversation that accommodates more than two participants. A messaging conversation may comprise a one-on-one messaging conversation, where the incoming message 210 is received from a first user account and the incoming message 210 is sent to a second user account. The first user account may be assigned a first user identifier and the second user account assigned a second user identifier. In one embodiment, the messaging conversation identifier is assigned as a sorted tuple of the first user identifier and the second user identifier, such that the lower-value user identifier of the first user identifier and the second user identifier is listed first in the sorted tuple and the higher-value user identifier of the first user identifier and the second user identifier is listed second in the sorted tuple. In an alternative embodiment, the messaging conversation identifier may comprise a bitwise logical exclusive disjunction (i.e., XOR) of the first user identifier and the second identifier.

The messaging conversation identifier may be specified by the client messaging component 226 of the messaging client on the sender client device 220 and included in a metadata field of the message 210. The sender client device 220 executes a messaging client, with the messaging client operative to determine the messaging conversation identifier by combining the first user identifier and second user identifier.

The messaging system 100 maintains a potential messaging conversation state for all pairs of users of the messaging system based on combined user identifiers. This potential messaging conversation state may not be represented through the explicit storage of messaging conversation state in the messaging system 100, but instead through the capability of the messaging system 100 to receive incoming messages that are for a messaging conversation for any pair of users of the messaging system 100 through the assignment of the appropriate messaging conversation identifier without the messaging conversation for that pair of users having been previously established by the sender.

This is in contrast to group messaging conversations, which may involve an explicit step of establishing the group messaging conversation prior to the messaging system 100 allowing messages to be submitted to it. Where the messaging conversation is a group messaging conversation the messaging conversation identifier is a uniquely-assigned group messaging conversation identifier assigned by the messaging system.

The client front-end component 230 may receive a group messaging conversation creation request for a group messaging conversation. The group messaging conversation creation request may indicate two or more participants in the group messaging conversation as initial invited participants in the group messaging conversation. One of these participants may be the user requesting the group messaging conversation be created. A group messaging conversation management component may be generally arranged to manage the creation and identification of group messaging conversations. The group messaging conversation management component may generate a uniquely-assigned group messaging conversation identifier in response to the group messaging conversation creation request. The group messaging conversation management component may store a group messaging conversation state in a group messaging conversation record storage system based on indexing the group messaging conversation state with the group messaging conversation identifier. The group messaging conversation record state indicates, at least, the two or more participants.

The message queue 280 stores the incoming message in a message storage system based on indexing the incoming message based on the message identifier. In some embodiments, the message identifier may be used as an indexing value for a message identifier index of the message storage system 255. Alternatively, indexing the incoming message based on the message identifier may comprise using the messaging conversation identifier contained within the message identifier as an indexing value for a messaging conversation index of the message storage system 255. The client front-end component 230 may decompose the message identifier into the messaging conversation identifier and the message timestamp store the incoming message 210 in the message storage system 255 based on indexing the incoming message 210 with the messaging conversation identifier and the message timestamp. The message storage system 255 may use a plurality of indices, such one or more of a message identifier index, messaging conversation identifier index, and a message timestamp index. The client front-end server 235 storing the message 210 in the message storage system 255 may be processed with the message queue 280 as an intermediary.

The client front-end component 230 distributes the incoming message 210 to a plurality of client devices via a message queue 280. The plurality of client devices are selected according to a messaging subscription to the messaging conversation based on the messaging conversation identifier. For instance, a particular recipient client device 290 may be subscribed to all messaging conversations in which the user of the recipient client device 290 is a participant. The recipient client device 290 is recognized as a subscriber to the message conversation based on a mapping of the messaging conversation identifier to the recipient client device 290 and/or to a user account for the user of the recipient client device 290.

A message 210 may comprise a group messaging conversation state change indication changing some portion of the group messaging conversation state. The group messaging conversation state change may comprise, without limitation, one of a group conversation membership change, a group conversation name assignment, and a group conversation user interface customization. The client front-end component 230 receives a group messaging conversation state change indication for the group messaging conversation and distributes the group messaging conversation state change indication to a plurality of client devices, wherein the plurality of client devices are selected according to a messaging subscription to the group messaging conversation based on the group messaging conversation identifier.

The sender client device 220 may perform a message retrieval request, the message retrieval request a request to retrieve one or more messages. The message retrieval request may comprise one or more retrieval parameters identifying what messages should be retrieved. Retrieval parameters may indicate that a general inbox retrieval should be performed, wherein a predefined number of recent threads should be retrieved (e.g., the twenty threads that have most recently had messages sent or received in them) and a predefined number of recent messages in each of the recent threads (e.g., the twenty most recent messages in each of the most recent threads). In some embodiments, the message retrieval request may be automatically performed by the client messaging component 226 in response to the message 210 being sent so as to retrieve the message 210 from the messaging system 100 with the one or more assigned index values.

The client front-end component 230 may receive a message retrieval request from the sender client device 220. Retrieval the plurality of messages may comprise performing a retrieval with the message storage system 255. The client front-end server 235 receives the plurality of messages from the message storage system 255 and returns the plurality of messages to the sender client device 220 in response to the message retrieval request.

The client front-end component 230 may retrieve the incoming message 210 from the message storage system 255 based on identifying the incoming message 210 with the messaging conversation identifier. The client front-end component 230 may retrieve the incoming message 210 from the message storage system 255 based on identifying the incoming message 210 with the messaging conversation identifier and the message timestamp. The message timestamp may be selected for by being part of a specified range of timestamps. The message timestamp may be selected for by the messaging client requesting recent messages and the message 210 having a message timestamp that brings it within the range of recent messages. The message storage system 255 may be sorted primarily by messaging conversation identifier value and sorted secondarily by message timestamp value to empower these retrievals.

A messaging conversation may be associated with one or more media items shared within the messaging conversation. The messaging conversation identifier indexes both the message storage system 255 and a media storage system 275 storing the one or more media items shared within the messaging conversation. The media storage system 275 may comprise a media store 270, comprising one or more devices storing media. The media store 270 may comprise a distributed media store 270 comprising multiple storage devices.

An incoming message 210 may be associated with a media item 215. The media 215 may be received in an upload from the sender client device 220 to the message system 100. This upload may be part of the upload of the message 210 or may comprise a distinct file upload. The client front-end component 230 stores the media item 215 in the media storage system 275 based on indexing the media item with the messaging conversation identifier. The messaging conversation identifier is used as an indexing value in a messaging conversation identifier index of the media storage system 275.

A client front-end component 230 may retrieve the media item 215 from the media storage system 275 based on retrieving one or more messaging conversation media items using the messaging conversation identifier. Such a retrieval may be used to distribute the media item 215 to a recipient client device 290 or a plurality of recipient client devices including the recipient client device 290.

References to messages may be distributed as uniform resource locators (URLs). These URLS may use message identifiers to identify the references messages. The client front-end component 230 may generate a message uniform resource locator pointing to the incoming message 210 wherein the message uniform resource locator contains the message identifier. For instance, the text of the message URL may include the message identifier.

Delayed Bulk Data Processing

Figure 3:
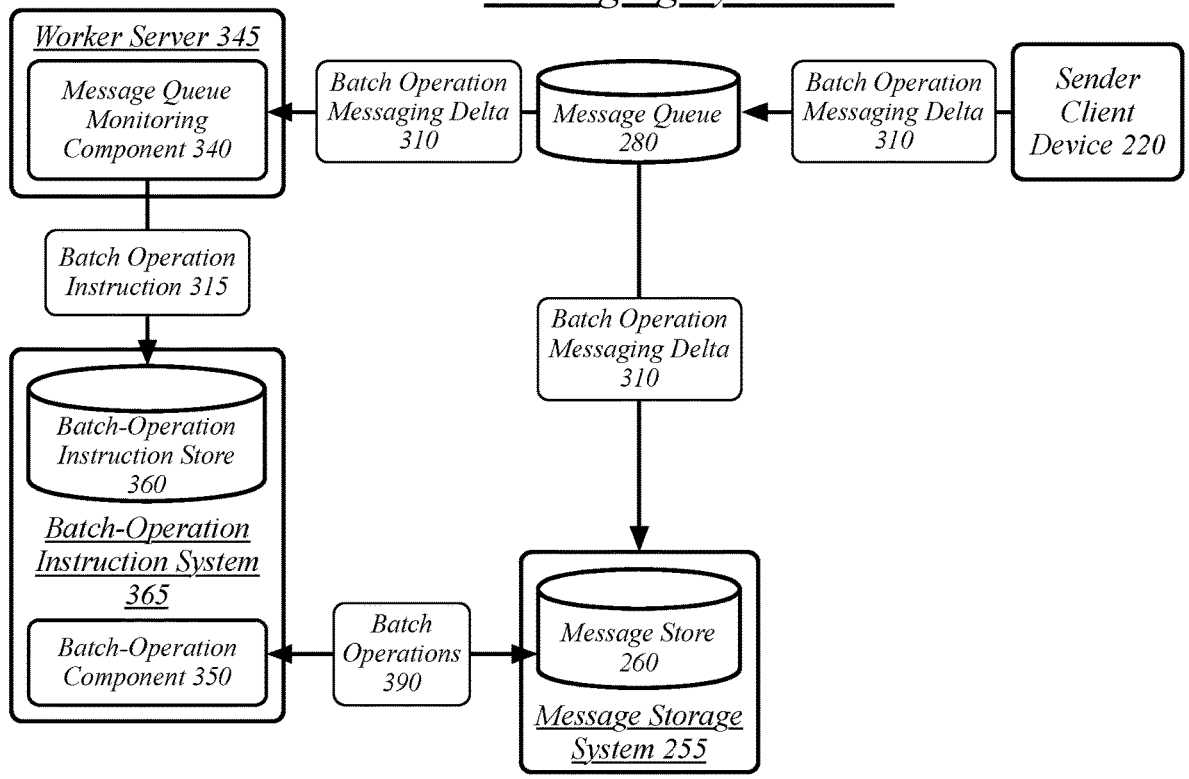
FIG. 3 illustrates an embodiment of a messaging system storing and performing batch operations.

FIG. 3 illustrates an embodiment of a messaging system 100 storing and performing batch operations.

The messaging system 100 may comprise one or more worker servers, such as a worker servers 345. In general, the messaging system 100 may comprise a plurality of worker servers that may be assigned to various tasks. A worker server 345 may comprise a message queue monitoring component 340, the message queue monitoring component 340 arranged to monitor updates, such as may comprise messages, in the message queue 280 and other message queues of the messaging system 100 for various flags, indicators, and other information.

The messaging system 100 may comprise a batch-operation instruction system 365. The batch-operation instruction system 365 is generally arranged to handle batch operations for the messaging system 100. The batch-operation instruction system 365 comprises a batch-operation component 350 and a batch-operation instruction store 360. The batch-operation component 350 performs batch operations 390 on the message store 260. The batch-operation instruction store 360 stores instructions for batch operations for eventual execution by the batch-operation component 350. The batch-operation instruction system 360 may comprise a batch-operation instruction database, wherein each row of the batch-operation instruction database comprises a particular batch-operation instruction.

The messaging system 100 receives a plurality of messaging deltas. A messaging delta is an atomic change to the messaging state of the messaging system 100. A messaging delta may comprise, for instance, a message addition delta that adds a message to the messaging system 100, which may correspond to the message being sent from one user of the messaging system 100 to one or more other users of the messaging system 100, such that a message delta is an incoming message for the messaging system. One or more client front-end components receive the plurality of message deltas and queue the plurality of messaging deltas through a message queue 280 of the messaging system 100. For example, a sender client device 220 may send a message delta that is a batch operation messaging delta 310 to a client front-end component 230, where it is then queued in the message queue 280.

The message queue monitoring component 340 monitors the message queue 280 to identify a plurality of batch-operation messaging deltas of the plurality of messaging deltas. The message queue monitoring component 340 may identify the plurality of batch-operation messaging deltas based on the plurality of batch-operation messaging deltas corresponding to one or more predefined batch-operation types, the one or more predefined batch-operation types comprising one or more of a user deletion type, a message deletion type, a conversation deletion type, and a redundant archiving type. The predefined batch-operation types comprise a subset of the available message delta types. The message queue monitoring component 340 stores a plurality of batch-operation instructions in a batch-operation instruction system 365, wherein the plurality of batch-operation instructions are based on the plurality of batch-operation messaging deltas. The plurality of batch-operation instructions comprise instructions to the batch-operation component 350 configuring it to perform patch operations 390.

A user deletion type messaging delta is an instruction to delete a particular user. Typically, a user deletion type message delta will be received from the user account that is requested for deletion, such that it occurs when a user requests that they be deleted from the messaging system 100. Deleting a user may result in all of that user's messages being deleted from the message storage system 255. This may use enough time to perform that the mass deletion is performed by the batch-operation instruction system 365.

A message deletion type message delta is an instruction to delete one or more messages from the messaging system 100. For instance, a user may request that all messages in a particular messaging conversation older than a particular timestamp be deleted. Deleting a span of messages may use time that scales with the number of messages in that span, thereby potentially using arbitrary amounts of processing resources and time to execute.

The message queue monitoring component 340 may identify a batch operation message delta 310 as a message deletion command. The message deletion command may specify a range of messages in a messaging conversation to be deleted. The message queue monitoring component 340 marks the messaging conversation with the message deletion command and stores the message deletion command in the batch-operation instruction system 365. Marking the messaging conversation with the message deletion command is operative to prevent display of the range of messages on one or more client devices prior to the performance of the message deletion command. Client devices subscribed to the messaging conversation received the message deletion mark which suppresses display when the messaging conversation is displayed on the client devices as a message thread. The actual deletion of the messages from the messaging system 100 may then be performed when processing resources are available.

A conversation deletion type messaging delta is an instruction to delete a particular messaging conversation from the messaging system 100. A user may request that a particular messaging conversation that they participate in be deleted, including all the messages in that messaging conversation.

A redundant archiving type messaging delta comprises any message that matches a policy for redundant message archiving. Certain users, certain messaging conversations, or other indicators may correspond to a policy for redundant message archiving. Where a batch operation messaging delta 310 for a message matches a policy for redundant message archiving, the batch operation messaging delta 310 is recognized by a message queue monitoring component 340 and a corresponding batch-operation instruction 315 is stored in the batch-operation instruction system 365.

The batch-operation component 350 performs the plurality of batch-operation instructions as a series of batch operations 390. The batch-operation component 350 retrieves a batch-operation instruction 315 from the batch-operation instruction store 360 and perform its. Processing one or more of the batch-operation instructions may comprise deleting one or more messages from the message storage system 255 based on specified message ranges or other criteria.

The messaging system may comprise a distributed message storage system 255 using plurality of storage devices as a distributed message store 260. The distributed message storage system 255 may be split into a plurality of message storage shards. A message storage shard is a particular technique for dividing stored information between devices, wherein user accounts of the messaging system 100 are assigned to particular message storage shards. A single message storage shard may still be distributed across multiple physical storage devices (e.g., drives, computers, network accessible storage), with the multiple physical storage devices operating as a logical unit within the distributed message storage system 255. In some embodiments, accessing the message storage shard may be performed via a storage system abstraction layer that abstracts the technical implementation of the message store 260. For instance, the choice of database technology used to implement a message storage shard may abstracted by the storage system abstraction layer.

A batch-operation component 350 may select a message storage shard of the plurality of message storage shards. In some embodiments, the batch-operation instruction system 265 may comprise a plurality of batch-operation components, with each of the batch-operation components assigned to a particular message storage shard. In other embodiments, associations between batch-operation components and message storage shards may be dynamically assigned based on the demands of the batch operation instructions being processed by the batch-operation instruction system 365.

In one embodiment, the batch-operation component 350 scans the message storage shard to identify one or more target user accounts corresponding to one or more batch-operation instructions of the plurality of batch-operation instructions. The batch-operation component 350 then performs the one or more batch-operation instructions in association with the one or more target user accounts. This may comprise identifying and deleting one or more messages that are associated with the target user accounts.

In another embodiment, the batch-operation component 350 takes a batch operation instruction 315 of a plurality of batch operations instructions in turn and directly performs the batch operation instruction 315. For instance, where a batch operation instruction 315 specifies one or more messages for deletion, the batch-operation component 350 may identify the messages based on message identifiers or a combination of a messaging conversation identifier and a timestamp range, and instruct the message storage shard to delete the one or more messages.

The performance of a batch-operation instruction 315 may result in failure due to physical failure of storage devices, software failure, or other causes of failure in a message storage system 255. The batch-operation component 350 may therefore receive a failure notification while performing a failed batch-operation instruction 315 of the plurality of batch-operation instructions. Where this occurs, the batch-operation component 350 retains the failed batch-operation instruction in the batch-operation instruction store 360 for re-performance, in contrast to where a batch-operation instruction 315 succeeds and it is deleted from the batch-operation instruction store 360.

The batch-operation component 350 may initiate performance of one or more batch-operation instructions of the plurality of batch-operation instructions with a message storage shard of the plurality of message storage shards and detect that one or more signals indicate that the message storage shard is overloaded. The one or more signals may comprise one or more of shard error rate, shard write usage, and shard read usage. Shard error rate indicates a rate at which errors are being detected in the performance of storage operations (i.e., reads and writes). Shard write usage indicates an extent to which a write capacity of the message storage shard is being utilized, such as may be expressed as a percentage. Shard read usage indicates an extent to which a read capacity of the message storage shard is being utilized, such as may be expressed as a percentage. The batch-operation component 350 may throttle (i.e., reduce the rate of) performance of the plurality of batch-operation instructions with the message storage shard in response to detecting that the one or more signals indicate that the message storage shard is overloaded. This may serve to reduce the load on the message storage shard and thereby free up read and write capacity for the performance of operations that receive a greater benefit from immediate performance, such as the retrieval of messages for display to a user of the messaging system 100.

Scoped Deduplication

Figure 4:
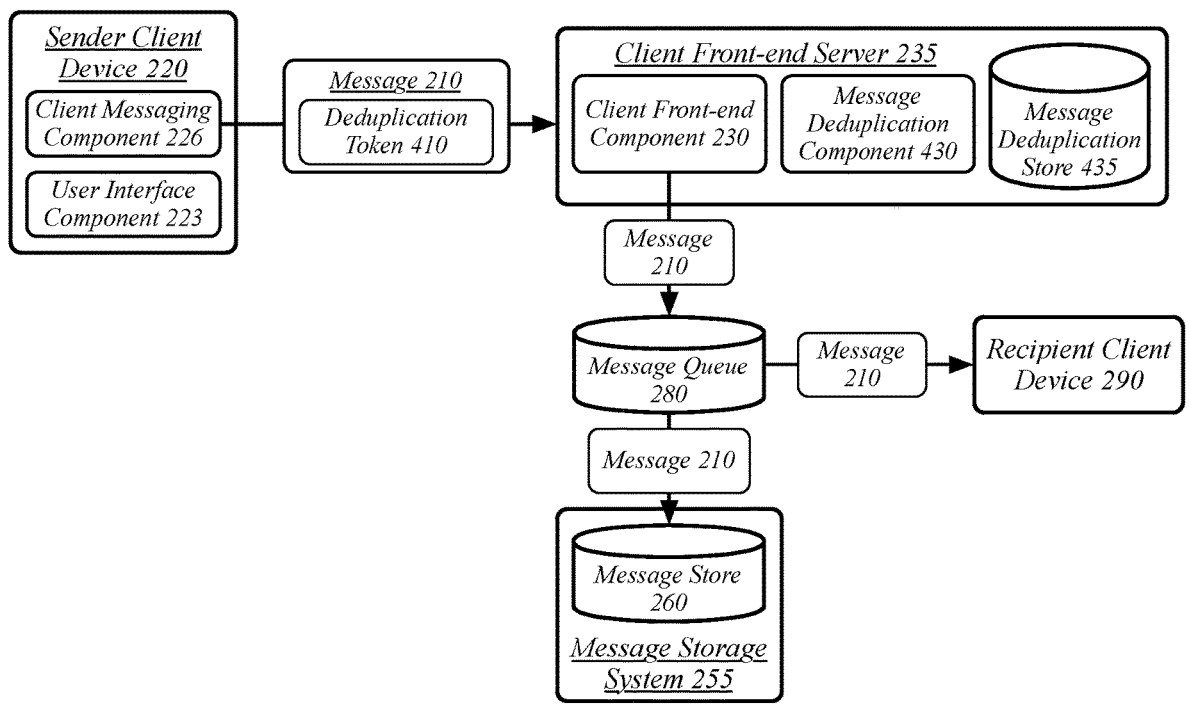
FIG. 4 illustrates an embodiment of a messaging system checking a message for duplication.

FIG. 4 illustrates an embodiment of a messaging system 100 checking a message for duplication.

The client front-end server 235 may comprise a message deduplication component 430. The message deduplication component 430 is generally arranged to examine incoming messages to determine whether they are duplicates (i.e., resends) of messages previous received from a sender client device 220.

When an incoming message is received at the client front-end component 230 from a messaging client on a sender client device 220, the client front-end component 230 extracts a deduplication token 410 from the incoming message 210. The deduplication token 410 may be received in a metadata field of the incoming message 210.

The deduplication token 410 may comprise a client timestamp and a randomly-generated nonce. The randomly-generated nonce is generated randomly by the client message component 226 when a message is generated and queued for sending to the client front-end component 230. The client messaging component 226 maintains an outgoing queue of messages (i.e., messaging updates, deltas) that are ready for sending to a client front-end component 230.

The client messaging component 226 attempts to send the message 210 to the client front-end component 230 when a network connection between the two is available. The client messaging component 226 queues messages when no network connection is available. The client messaging component 226 will continue attempting to send the message 210 while a network connection is available until it receives a confirmation from the client front-end component 230 that the message 210 has been received. In some cases, the message 210 may be received from the client messaging component 226 by the client front-end component 230, but the acknowledgement of the message 210 sent by the client front-end component 230 isn't received by the client messaging component 226. This may happen, for example, due to interruption or other failure of the network connection.

When the acknowledgement isn't received by the client messaging component 226 it will attempt to resend the message 210. To prevent the messaging conversation that the message 210 belongs to from having the message 210 added multiple times, the message deduplication component 430 is used to catch the duplicate message and cause it to be discarded rather than distributed. In some embodiments, the incoming message may be automatically discarded where a client timestamp of the message 210 is older than a predefined timestamp age threshold. This constraints the scope over which the message deduplication component 430 operates and the span of messages to which it compares the message 210 to.

The message deduplication component 430 examines the deduplication token 410 to determine whether the incoming message 210 duplicates any existing message of the messaging system 100, such as any message stored in the message storage system 255. The client front-end component 230 stores the incoming message 210 in a message queue 280 where examining the deduplication token 410 determines that the incoming message 210 does not duplicate any existing message, which may comprise determining that the incoming message 210 does not duplicate any existing message within the scope of messages determined by the timestamp age threshold. The message deduplication component 430 discards the incoming message 210 where examining the deduplication token 410 determines that the incoming message 210 does duplicate an existing message.

The message deduplication component 430 may use a message deduplication store 435 to store information used to perform deduplication. The message deduplication store 435 may store a probabilistic data structure representing a plurality of deduplication tokens received for the messaging client. A probabilistic data structure is maintained by the message deduplication component 430 for each messaging client on each client device. The probabilistic data structure may comprise a Bloom filter, the Bloom filter created and maintained according to known techniques. The probabilistic data structure may represent all received messages for the messaging client younger than the predefined timestamp age threshold. As each message 210 is received, once it has been verified as not being a duplicate, the probabilistic data structure is modified to represent the non-duplicate incoming message 210.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
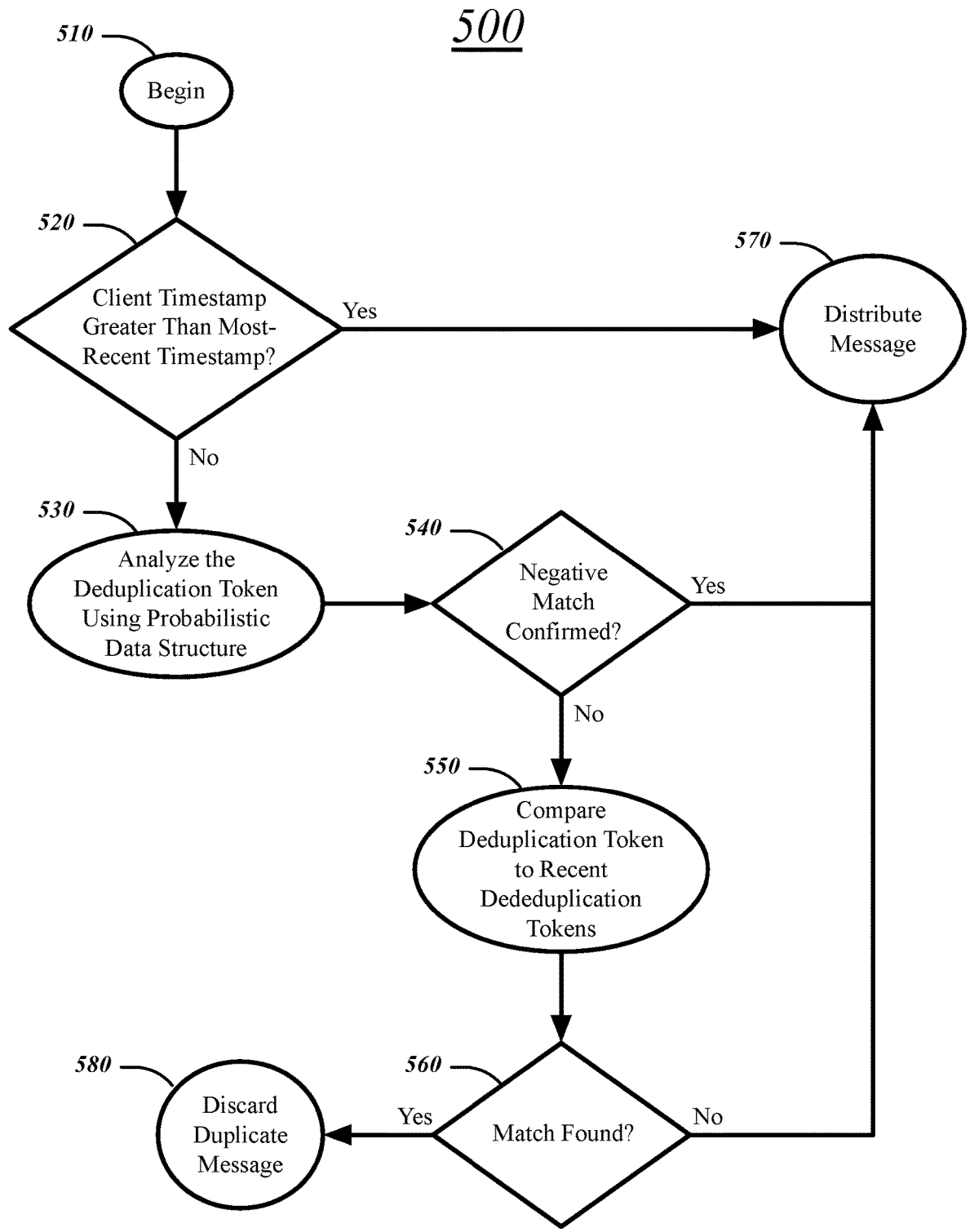
FIG. 5 illustrates an embodiment of a logic flow for message deduplication.

FIG. 5 illustrates an embodiment of a logic flow for message deduplication. The logic flow 500 may be representative of some or all of the operations executed by one or more embodiments described herein.

In the illustrated embodiment shown in FIG. 5, the logic flow 500 may begin at block 510. The logic flow 500 may correspond to the initiation of the examination of a deduplication token 410 received with an incoming message 210 to determine whether the message 210 is a duplicate. The logic flow 500 proceeds to block 520.

The logic flow 500 may examine the deduplication token 410 to determine whether the incoming message 210 duplicates any existing message of the messaging system 100 by comparing the client timestamp from the deduplication token 410 to a most-recent client timestamp for the messaging client at block 520. Where the client timestamp of the deduplication token 410 is greater than a most-recent timestamp for the messaging client that sent the message, as maintained in the message deduplication store 435 for each messaging client, the message 210 cannot be a duplicate and therefore the logic flow 500 proceeds to block 570 for the message 210 to be distributed through the messaging system 100. Where the client timestamp of the deduplication token 410 is less than or equal to (i.e., not greater than) a most-recent timestamp for the messaging client that sent the message, the message 210 may be a duplicate, and therefore the logic flow 500 proceeds to block 530 to continue being examined.

The logic flow 500 may analyze the deduplication token 410 using the probabilistic data structure to determine whether the probabilistic data structure provides a positive result or a negative result at block 350. Block 530 is performed where comparing the client timestamp from the deduplication token 410 to the most-recent client timestamp for the messaging client indicates the client timestamp is not a highest timestamp for the messaging client.

The logic flow 500 may branch based on whether a negative match is confirmed by the probabilistic data structure at block 540. The probabilistic data structure may be use a technique, such as a Bloom filter, where a negative match—an indication that the deduplication token 410 is not represented in the data structure and is therefore unique for the messaging client within the scope of time represented by the data structure—is guaranteed to be accurate, while a positive match—an indication that the deduplication token 410 may be represented in the data structure is therefore not unique for the messaging client within the scope of time represented by the data structure—is not guaranteed to be accurate. This makes the probabilistic data structure accurate where it determines that an incoming message 210 is not a duplicate and potentially inaccurate where it determines that an incoming message 210 is a duplicate. As such, where a negative match is confirmed, the logic flow 500 proceed to block 570 and distribution of the message 210. Where a negative match is not confirmed, where a positive match is possible, the logic flow 500 proceeds to block 550 to continue being examined.

The logic flow 500 may compare the deduplication token 410 to a plurality of recently-received deduplication tokens from the messaging client at block 550. This sort of direct comparison between the deduplication token 410 to the recently-received deduplication tokens for the message client may be computationally expensive and may use computational resources linear with the number of messages received from the messaging client within the timestamp age threshold allowed to the messaging client. As such, this process is only performed where comparing the client timestamp from the deduplication token 410 to the most-recent client timestamp for the messaging client indicates the client timestamp is not the highest timestamp for the messaging client and analyzing the client timestamp using the probabilistic data structure provides the positive result. The deduplication token 410 and the recently-received deduplication tokens are directly compared to determine if any are an exact match to the deduplication token 410. The logic flow then proceeds to block 560.

The logic flow 500 may branch based on whether a match is found between the deduplication token 410 under consideration and the recently-received deduplication tokens for the messaging client at block 560. Where no match is found, the message 210 is not a duplicate, and therefore the logic flow 500 proceeds to block 570 for the distribution of the message 210 through the messaging system 100. Where a match is found, the message 210 is a duplicate, and therefore the logic flow 500 proceeds to block 580 and the discarding of the message 210.

The logic flow 500 may distribute the incoming message 210 by storing the incoming message 210 in a message queue 280 at block 570. This is performed where comparing the client timestamp from the deduplication token 410 to the most-recent client timestamp for the messaging client indicates the client timestamp is the highest timestamp for the messaging client, analyzing the deduplication token 410 using the probabilistic data structure provides the negative result, or comparing the deduplication token 410 to the plurality of recently-received deduplication tokens from the messaging client does not indicate duplication. The logic flow 500 then concludes.

The logic flow 500 may discarding the duplicate message 210 at block 580. This is performed where comparing the client timestamp from the deduplication token 410 to the most-recent client timestamp for the messaging client indicates the client timestamp is not the highest timestamp for the messaging client, analyzing the deduplication token 410 using the probabilistic data structure provides the positive result, and comparing the deduplication token 410 to the plurality of recently-received deduplication tokens from the messaging client indicates duplication. The logic flow 500 then concludes.

FIG. 6A illustrates one embodiment of a logic flow 600. The logic flow 600 may be representative of some or all of the operations executed by one or more embodiments described herein.

In the illustrated embodiment shown in FIG. 6A, the logic flow 600 may receive an incoming message from a client device at a client front-end component for a messaging system at block 602.

The logic flow 600 may extract a messaging conversation identifier for a messaging conversation from the incoming message, wherein the messaging conversation identifier uniquely identifies the messaging conversation for the incoming message, wherein the incoming message is one of a plurality of messaging conversation messages for the messaging conversation at block 604.

The logic flow 600 may store the incoming message in a message storage system based on indexing the incoming message with the messaging conversation identifier at block 606.

Figure 6B:
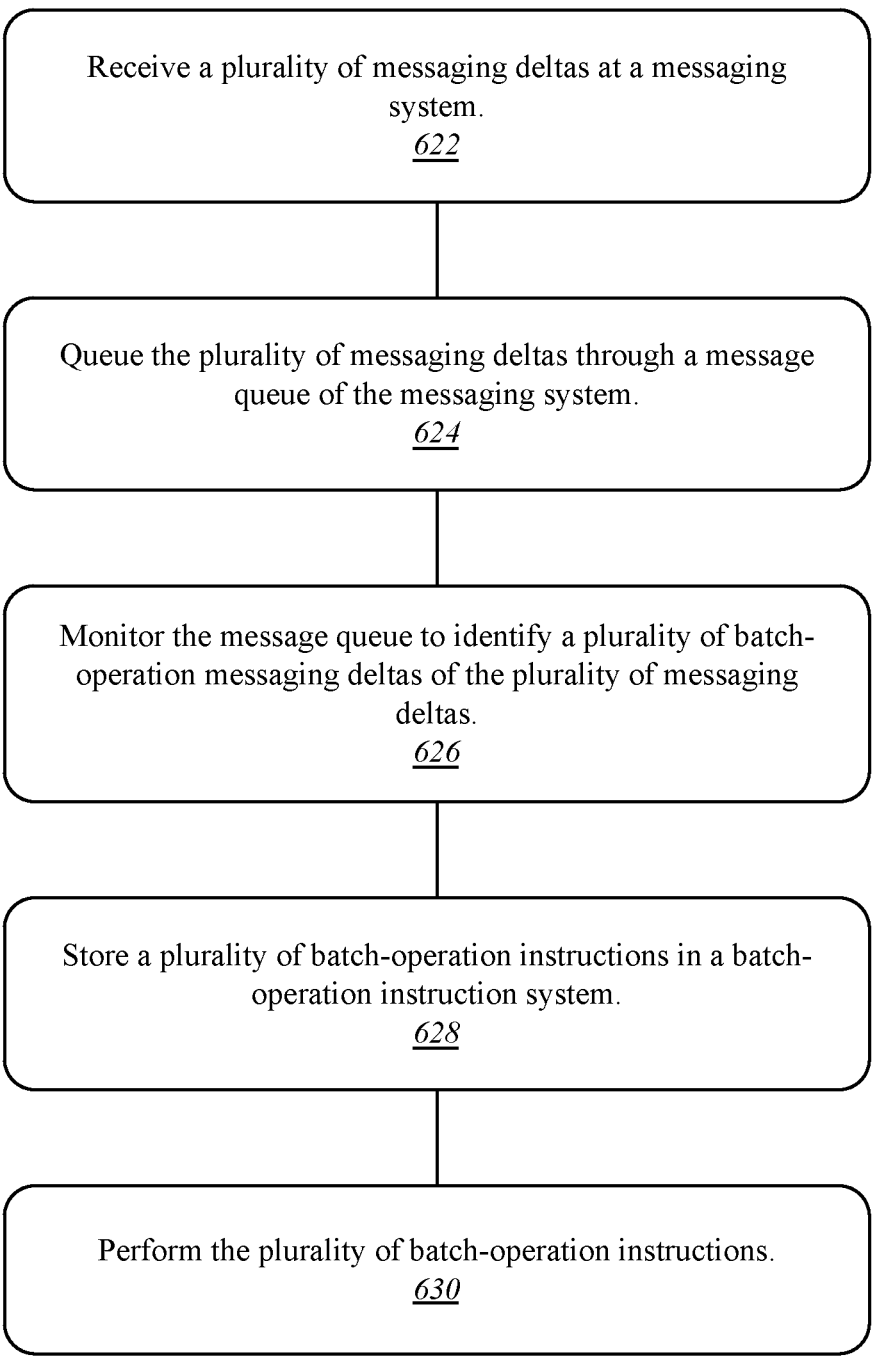
FIG. 6B illustrates an embodiment of a third logic flow for the messaging system of FIG. 1.

FIG. 6B illustrates one embodiment of a logic flow 620. The logic flow 620 may be representative of some or all of the operations executed by one or more embodiments described herein.

In the illustrated embodiment shown in FIG. 6B, the logic flow 620 may receive a plurality of messaging deltas at a messaging system at block 622.

The logic flow 620 may queue the plurality of messaging deltas through a message queue of the messaging system at block 624.

The logic flow 620 may monitor the message queue to identify a plurality of batch-operation messaging deltas of the plurality of messaging deltas at block 626.

The logic flow 620 may store a plurality of batch-operation instructions in a batch-operation instruction system at block 628.

The logic flow 620 may perform the plurality of batch-operation instructions at block 630.

Figure 6C:
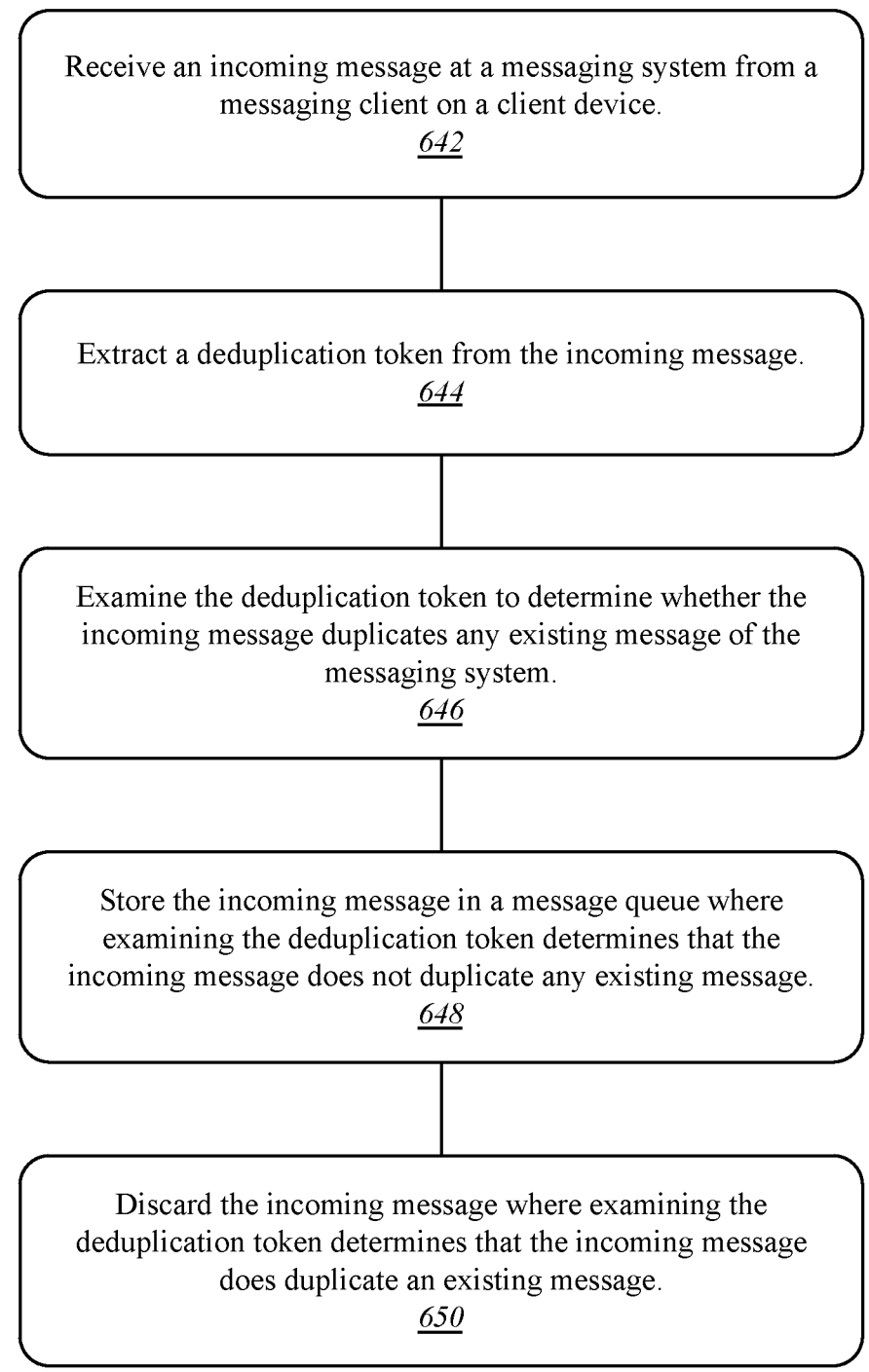
FIG. 6C illustrates an embodiment of a fourth logic flow for the messaging system of FIG. 1.

FIG. 6C illustrates one embodiment of a logic flow 640. The logic flow 640 may be representative of some or all of the operations executed by one or more embodiments described herein.

In the illustrated embodiment shown in FIG. 6C, the logic flow 640 may receive an incoming message at a messaging system from a messaging client on a client device at block 642.

The logic flow 640 may extract a deduplication token from the incoming message at block 644.

The logic flow 640 may examine the deduplication token to determine whether the incoming message duplicates any existing message of the messaging system at block 646.

The logic flow 640 may store the incoming message in a message queue where examining the deduplication token determines that the incoming message does not duplicate any existing message at block 648.

The logic flow 640 may discard the incoming message where examining the deduplication token determines that the incoming message does duplicate an existing message at block 650.

FIG. 6D illustrates one embodiment of a logic flow 660. The logic flow 660 may be representative of some or all of the operations executed by one or more embodiments described herein.

In the illustrated embodiment shown in FIG. 6D, the logic flow 660 may receive an incoming message from a client device at a client front-end component for a messaging system at block 662.

The logic flow 660 may extract a message identifier for the incoming message from the incoming message, wherein the message identifier uniquely identifies the incoming message at block 664.

The logic flow 660 may store the incoming message in a message storage system based on indexing the incoming message based on the message identifier at block 666.

The embodiments are not limited to these examples.

Figure 7:
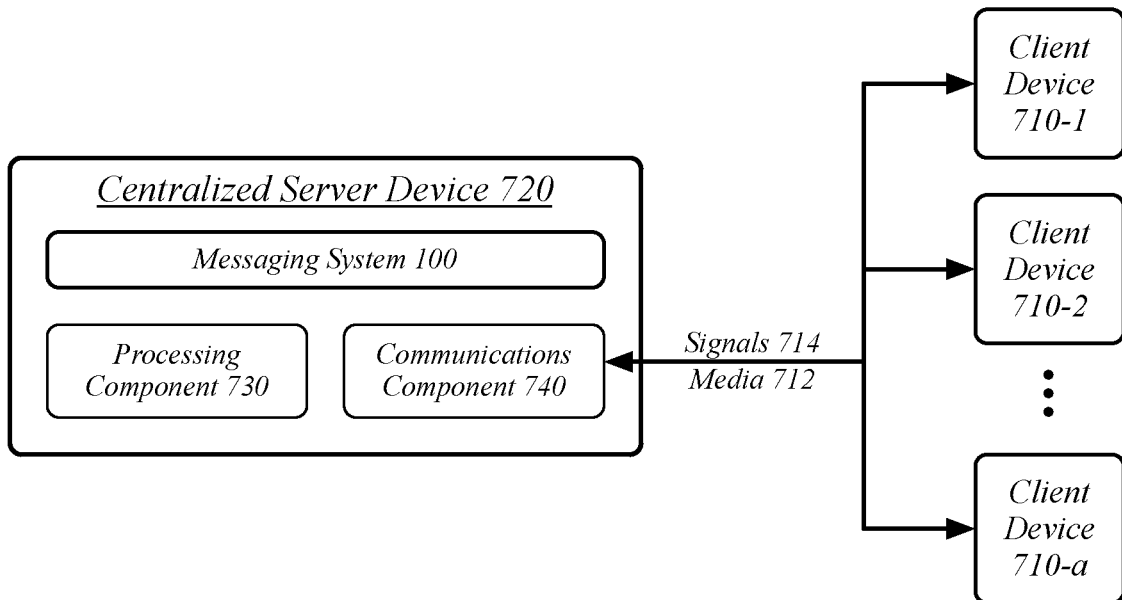
FIG. 7 illustrates an embodiment of a centralized system for the system of FIG. 1.

FIG. 7 illustrates a block diagram of a centralized system 700. The centralized system 700 may implement some or all of the structure and/or operations for the messaging system 100 in a single computing entity, such as entirely within a single centralized server device 720.

The centralized server device 720 may comprise any electronic device capable of receiving, processing, and sending information for the messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the messaging system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the messaging system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The devices may be internal or external to the centralized server device 720 as desired for a given implementation. The centralized server device 720 may communicate with a plurality of client devices 710, providing messaging services to the client devices 710.

Figure 8:
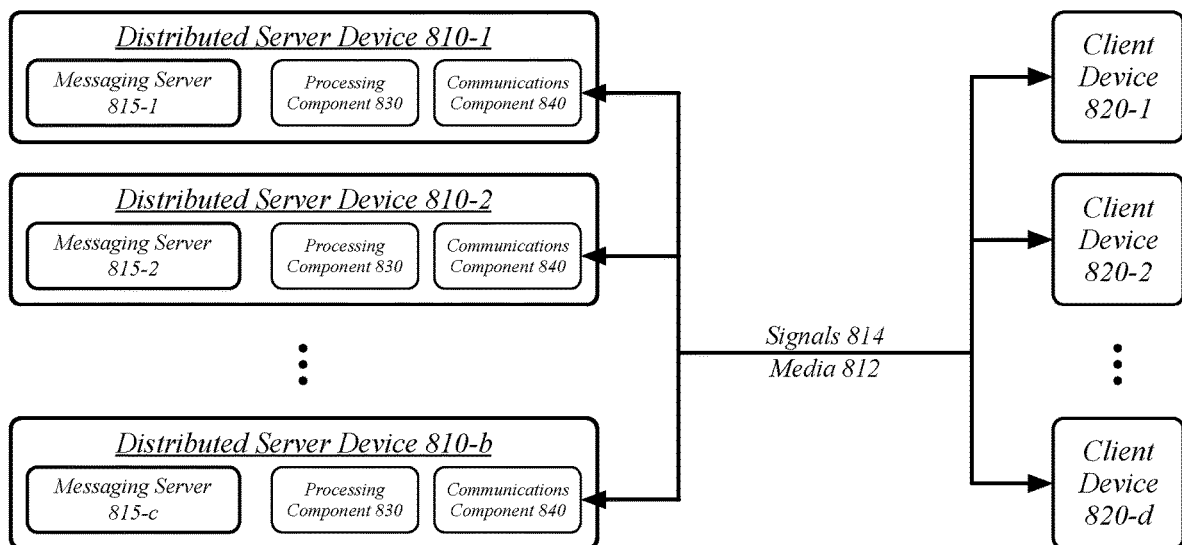
FIG. 8 illustrates an embodiment of a distributed system for the system of FIG. 1.

FIG. 8 illustrates a block diagram of a distributed system 800. The distributed system 800 may distribute portions of the structure and/or operations for the messaging system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of distributed server devices 810. In general, the server devices 810 may be the same or similar to the centralized server device 710 as described with reference to FIG. 7. For instance, the server devices 810 may each comprise a processing component 830 and a communications component 840 which are the same or similar to the processing component 730 and the communications component 740, respectively, as described with reference to FIG. 7. In another example, the server devices 810 may communicate over a communications media 812 using communications signals 814 via the communications components 840.

The plurality of distributed server devices 810 may comprise or employ one or more server programs that operate to perform various methodologies in accordance with the described embodiments. In one embodiment, for example, the plurality of distributed server devices 810 may each implement a messaging server 815. The messaging servers 815 may generally correspond to the messaging servers 110 and may implement the operations of the messaging system 100 across a plurality of computing devices.

Figure 9:
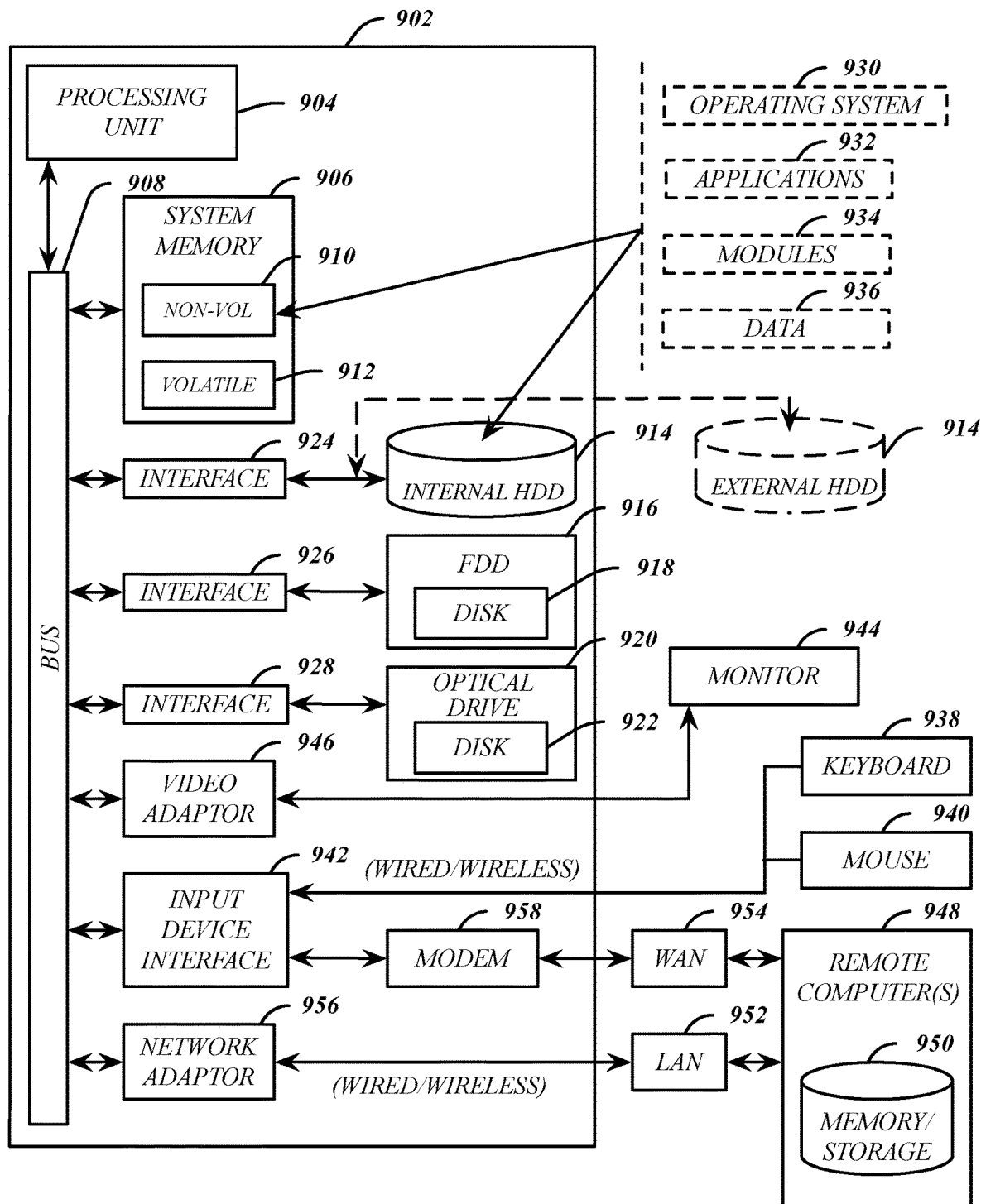
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the messaging system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
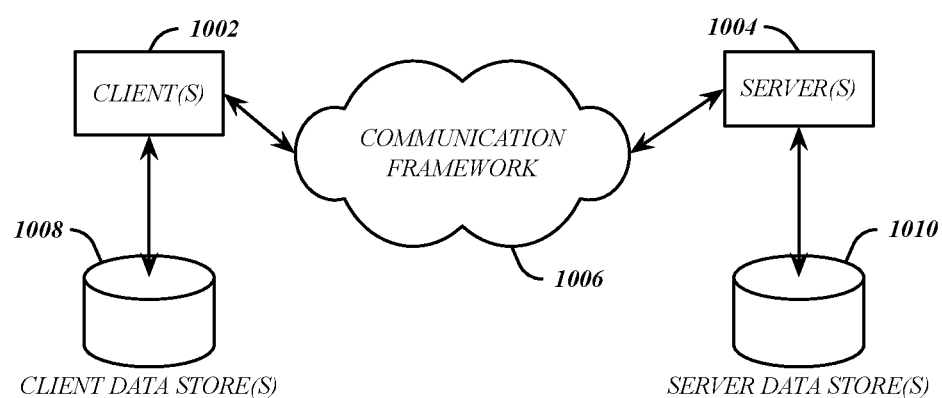
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may comprise various messaging clients on various client devices. The servers 1004 may comprise the messaging servers of the messaging system 100. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
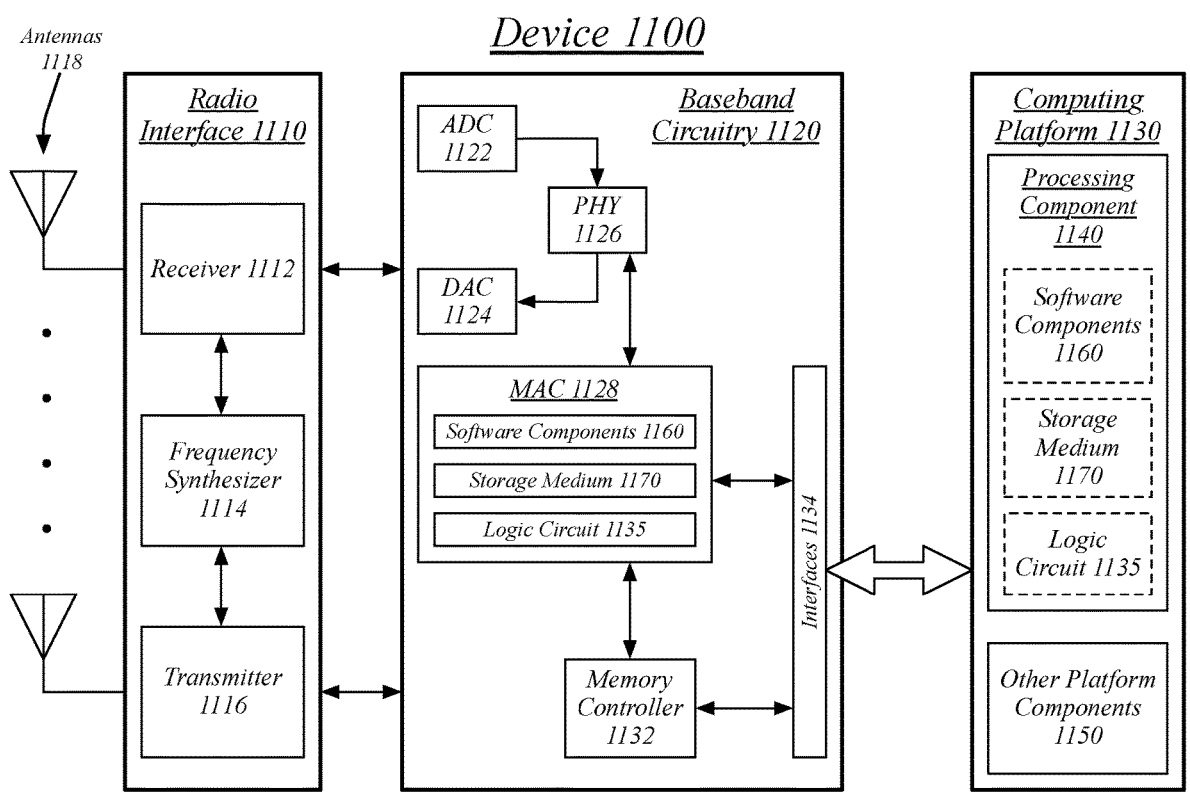
FIG. 11 illustrates an embodiment of a radio device architecture.

FIG. 11 illustrates an embodiment of a device 1100 for use in a multicarrier OFDM system, such as the messaging system 100. Device 1100 may implement, for example, software components 1160 as described with reference to messaging system 100 and/or a logic circuit 1135. The logic circuit 1135 may include physical circuits to perform operations described for the messaging system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the messaging system 100 and/or logic circuit 1135 in a single computing entity, such as entirely within a single device. Alternatively, the device 1100 may distribute portions of the structure and/or operations for the messaging system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the messaging system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving an incoming message from a client device at a client front-end component for a messaging system; extracting a messaging conversation identifier for a messaging conversation from the incoming message, wherein the messaging conversation identifier uniquely identifies the messaging conversation for the incoming message, wherein the incoming message is one of a plurality of messaging conversation messages for the messaging conversation; and storing the incoming message in a message storage system based on indexing the incoming message with the messaging conversation identifier.

A computer-implemented method may further comprise retrieving the incoming message from the message storage system based on identifying the incoming message with the messaging conversation identifier.

A computer-implemented method may further comprise distributing the incoming message to a plurality of client devices via a message queue, wherein the plurality of client devices are selected according to a messaging subscription to the messaging conversation based on the messaging conversation identifier.

A computer-implemented method may further comprise the messaging conversation associated with one or more media items shared within the messaging conversation, the messaging conversation identifier indexing both the message storage system and a media storage system storing the one or more media items shared within the messaging conversation.

A computer-implemented method may further comprise the incoming message associated with a media item, further comprising: storing the media item in a media storage system based on indexing the media item with the messaging conversation identifier.

A computer-implemented method may further comprise retrieving the media item from the media storage system based on retrieving one or more messaging conversation media items using the messaging conversation identifier.

A computer-implemented method may further comprise the messaging conversation comprising a one-on-one messaging conversation, the incoming message received from a first user account, the incoming message sent to a second user account, the first user account assigned a first user identifier, the second user account assigned a second user identifier, wherein the messaging conversation identifier is a sorted tuple of the first user identifier and the second user identifier.

A computer-implemented method may further comprise the client device executing a messaging client, the messaging client operative to determine the messaging conversation identifier by combining the first user identifier and second user identifier, wherein the messaging system maintains a potential messaging conversation state for all pairs of users of the messaging system based on combined user identifiers.

A computer-implemented method may further comprise the messaging conversation comprising a group messaging conversation, wherein the messaging conversation identifier is a uniquely-assigned group messaging conversation identifier assigned by the messaging system.

A computer-implemented method may further comprise receiving a group messaging conversation state change indication for the group messaging conversation; and distributing the group messaging conversation state change indication to a plurality of client devices, wherein the plurality of client devices are selected according to a messaging subscription to the group messaging conversation based on the group messaging conversation identifier.

A computer-implemented method may further comprise the group messaging conversation state change comprising one of a group conversation membership change, a group conversation name assignment, and a group conversation user interface customization.

A computer-implemented method may further comprise receiving a group messaging conversation creation request for the group messaging conversation, the group messaging conversation creation request indicating two or more participants in the group messaging conversation; generating the uniquely-assigned group messaging conversation identifier in response to the group messaging conversation creation request; and storing a group messaging conversation state in a group messaging conversation record storage system based on indexing the group messaging conversation state with the group messaging conversation identifier, wherein the group messaging conversation record state comprises the two or more participants.

An apparatus may comprise a client front-end component operative to receive an incoming message from a client device at a client front-end component for a messaging system; and extract a messaging conversation identifier for a messaging conversation from the incoming message, wherein the messaging conversation identifier uniquely identifies the messaging conversation for the incoming message, wherein the incoming message is one of a plurality of messaging conversation messages for the messaging conversation; and a message queue operative to store the incoming message in a message storage system based on indexing the incoming message with the messaging conversation identifier. The apparatus may be operative to implement any of the computer-implemented methods described herein.

A computer-implemented method may comprise receiving a plurality of messaging deltas at a messaging system; queueing the plurality of messaging deltas through a message queue of the messaging system; monitoring the message queue to identify a plurality of batch-operation messaging deltas of the plurality of messaging deltas; storing a plurality of batch-operation instructions in a batch-operation instruction system; and performing the plurality of batch-operation instructions.

A computer-implemented method may further comprise the batch-operation instruction system comprising a batch-operation instruction database.

A computer-implemented method may further comprise identifying the plurality of batch-operation messaging deltas based on the plurality of batch-operation messaging deltas corresponding to one or more predefined batch-operation types, the one or more predefined batch-operation types comprising one or more of a user deletion type, a message deletion type, a conversation deletion type, and a redundant archiving type.

A computer-implemented method may further comprise identifying a message deletion command, the message deletion command specifying a range of messages in a messaging conversation; marking the message messaging conversation with the message deletion command; and storing the message deletion command in the batch-operation instruction system.

A computer-implemented method may further comprise wherein marking the messaging conversation with the message deletion command is operative to prevent display of the range of messages on one or more client devices prior to the performance of the message deletion command.

A computer-implemented method may further comprise the messaging system comprising a distributed message storage system, the distributed message storage system comprising a plurality of message storage shards, wherein user accounts of the messaging system are assigned to particular message storage shards, further comprising: selecting a message storage shard of the plurality of message storage shards; scanning the message storage shard to identify one or more target user accounts corresponding to one or more batch-operation instructions of the plurality of batch-operation instructions; and performing the one or more batch-operation instructions in association with the one or more target user accounts.

A computer-implemented method may further comprise accessing the message storage shard via a storage system abstraction layer.

A computer-implemented method may further comprise wherein processing the one or more batch-operation instructions comprises deleting one or more messages from the message storage system based on specified message ranges.

A computer-implemented method may further comprise receiving a failure notification while performing a failed batch-operation instruction of the plurality of batch-operation instructions; and retaining the failed batch-operation instruction for re-performance.

A computer-implemented method may further comprise the messaging system comprising a distributed message storage system, the distributed message storage system comprising a plurality of message storage shards, further comprising: initiating performance of one or more batch-operation instructions of the plurality of batch-operation instructions with a message storage shard of the plurality of message storage shards; detecting that one or more signals indicate that the message storage shard is overloaded, the one or more signals comprising one or more of shard error rate, shard write usage, and shard read usage; throttling performance of the plurality of batch-operation instructions with the message storage shard in response to detecting that the one or more signals indicate that the message storage shard is overloaded.

An apparatus may comprise a client front-end component operative to receive a plurality of messaging deltas at a messaging system; and queue the plurality of messaging deltas through a message queue of the messaging system; a message queue monitoring component operative to monitor the message queue to identify a plurality of batch-operation messaging deltas of the plurality of messaging deltas; and store a plurality of batch-operation instructions in a batch-operation instruction system; and a batch-operation component of the batch-operation instruction system operative to perform the plurality of batch-operation instructions. The apparatus may be operative to implement any of the computer-implemented methods described herein.

A computer-implemented method may comprise receiving an incoming message at a messaging system from a messaging client on a client device; extracting a deduplication token from the incoming message; examining the deduplication token to determine whether the incoming message duplicates any existing message of the messaging system; storing the incoming message in a message queue where examining the deduplication token determines that the incoming message does not duplicate any existing message; and discarding the incoming message where examining the deduplication token determines that the incoming message does duplicate an existing message.

A computer-implemented method may further comprise the deduplication token comprising a client timestamp and a randomly-generated nonce.

A computer-implemented method may further comprise the deduplication token comprising a client timestamp, further comprising: discarding the incoming message where the client timestamp is older than a predefined timestamp age threshold.

A computer-implemented method may further comprise the deduplication token comprising a client timestamp, further comprising: examining the deduplication token to determine whether the incoming message duplicates any existing message of the messaging system by comparing the client timestamp from the deduplication token to a most-recent client timestamp for the messaging client.

A computer-implemented method may further comprise the deduplication token comprising a client timestamp, further comprising: maintaining a probabilistic data structure representing a plurality of deduplication tokens received for the messaging client; examining the deduplication token to determine whether the incoming message duplicates any existing message of the messaging system by comparing the client timestamp from the deduplication token to a most-recent client timestamp for the messaging client; and analyzing the deduplication token using the probabilistic data structure to determine whether the probabilistic data structure provides a positive result or a negative result where comparing the client timestamp from the deduplication token to the most-recent client timestamp for the messaging client indicates the client timestamp is not a highest timestamp for the messaging client.

A computer-implemented method may further comprise the probabilistic data structure comprising a Bloom filter.

A computer-implemented method may further comprise the probabilistic data structure representing all received messages for the messaging client younger than a predefined timestamp age threshold.

A computer-implemented method may further comprise the deduplication token comprising a client timestamp, further comprising: maintaining a probabilistic data structure representing a plurality of deduplication tokens received for the messaging client; examining the deduplication token to determine whether the incoming message duplicates any existing message of the messaging system by comparing the client timestamp from the deduplication token to a most-recent client timestamp for the messaging client; analyzing the deduplication token using the probabilistic data structure to determine whether the probabilistic data structure provides a positive result or a negative result where comparing the client timestamp from the deduplication token to the most-recent client timestamp for the messaging client indicates the client timestamp is not a highest timestamp for the messaging client; comparing the deduplication token to a plurality of recently-received deduplication tokens from the messaging client where comparing the client timestamp from the deduplication token to the most-recent client timestamp for the messaging client indicates the client timestamp is not the highest timestamp for the messaging client and analyzing the client timestamp using the probabilistic data structure provides the positive result; storing the incoming message in a message queue where comparing the client timestamp from the deduplication token to the most-recent client timestamp for the messaging client indicates the client timestamp is the highest timestamp for the messaging client, analyzing the deduplication token using the probabilistic data structure provides the negative result, or comparing the deduplication token to the plurality of recently-received deduplication tokens from the messaging client does not indicate duplication; and discarding the incoming message where comparing the client timestamp from the deduplication token to the most-recent client timestamp for the messaging client indicates the client timestamp is not the highest timestamp for the messaging client, analyzing the deduplication token using the probabilistic data structure provides the positive result, and comparing the deduplication token to the plurality of recently-received deduplication tokens from the messaging client indicates duplication.

An apparatus may comprise a client front-end component operative to receive an incoming message at a messaging system from a messaging client on a client device; extract a deduplication token from the incoming message; store the incoming message in a message queue where examining the deduplication token determines that the incoming message does not duplicate any existing message of the messaging system; and discard the incoming message where examining the deduplication token determines that the incoming message does duplicate an existing message; and a message deduplication component operative to examine the deduplication token to determine whether the incoming message duplicates any existing message of the messaging system. The apparatus may be operative to implement any of the computer-implemented methods described herein.

A computer-implemented method may comprise receiving an incoming message from a client device at a client front-end component for a messaging system; extracting a message identifier for the incoming message from the incoming message, wherein the message identifier uniquely identifies the incoming message; and storing the incoming message in a message storage system based on indexing the incoming message based on the message identifier.

A computer-implemented method may further comprise generating a message uniform resource locator pointing to the incoming message wherein the message uniform resource locator contains the message identifier.

A computer-implemented method may further comprise he message identifier comprising a base-sixty-four encoded string composed of a message timestamp for the incoming message, a messaging conversation identifier for a messaging conversation comprising the incoming message, and a deduplication token.

A computer-implemented method may further comprise the message identifier composed of a message timestamp for the incoming message, a messaging conversation identifier for a messaging conversation comprising the incoming message, and a deduplication token.

A computer-implemented method may further comprise decomposing the message identifier into the messaging conversation identifier and the message timestamp; and storing the incoming message in a message storage system based on indexing the incoming message with the messaging conversation identifier and the message timestamp.

A computer-implemented method may further comprise retrieving the incoming message from the message storage system based on identifying the incoming message with the messaging conversation identifier and the message timestamp.

A computer-implemented method may further comprise the message storage system sorted primarily by messaging conversation identifier value and sorted secondarily by message timestamp value.

A computer-implemented method may further comprise distributing the incoming message to a plurality of client devices via a message queue, wherein the plurality of client devices are selected according to a messaging subscription to the messaging conversation based on the messaging conversation identifier.

A computer-implemented method may further comprise the incoming message associated with a media item, further comprising: storing the media item in a media storage system based on indexing the media item with the messaging conversation identifier.

An apparatus may comprise a client front-end component operative to receive an incoming message from a client device at a client front-end component for a messaging system; and extract a message identifier for the incoming message from the incoming message, wherein the message identifier uniquely identifies the incoming message; and a message queue operative to store the incoming message in a message storage system based on indexing the incoming message based on the message identifier. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a plurality of messaging deltas at a messaging system, wherein each messaging delta is a change in a state of the messaging system on which actions are to be taken by the messaging system and wherein the messaging system comprises a distributed message storage system, the distributed message storage system comprising a plurality of message storage shards;
queueing the plurality of messaging deltas through a message queue of the messaging system;
monitoring the message queue to identify a plurality of batch-operation messaging deltas of the plurality of messaging deltas;
storing a plurality of batch-operation instructions in a batch-operation instruction system; and
performing one or more batch-operation instructions of the plurality of batch-operation instructions with a selected message storage shard of the plurality of message storage shards.

2. The method of claim 1, identifying the plurality of batch-operation messaging deltas based on the plurality of batch-operation messaging deltas corresponding to one or more predefined batch-operation types, the one or more predefined batch-operation types comprising one or more of a user deletion type, a message deletion type, a conversation deletion type, and a redundant archiving type.

3. The method of claim 1, further comprising:
identifying a message deletion command, the message deletion command specifying a range of messages in a messaging conversation;
marking the message messaging conversation with the message deletion command; and
storing the message deletion command in the batch-operation instruction system.

4. The method of claim 3, wherein marking the messaging conversation with the message deletion command is operative to prevent display of the range of messages on one or more client devices prior to the performance of the message deletion command.

5. The method of claim 1, wherein user accounts of the messaging system are assigned to particular message storage shards, further comprising:
selecting a given message storage shard of the plurality of message storage shards;
scanning the given message storage shard to identify one or more target user accounts corresponding to one or more batch-operation instructions of the plurality of batch-operation instructions; and
performing the one or more batch-operation instructions in association with the one or more target user accounts.

6. The method of claim 1, further comprising:
receiving a failure notification while performing a failed batch-operation instruction of the plurality of batch-operation instructions; and
retaining the failed batch-operation instruction for re-performance.

7. The method of claim 1, further comprising:
initiating performance of one or more batch-operation instructions of the plurality of batch-operation instructions with a given message storage shard of the plurality of message storage shards;
detecting that one or more signals indicate that the given message storage shard is overloaded, the one or more signals comprising one or more of shard error rate, shard write usage, and shard read usage;
throttling performance of the plurality of batch-operation instructions with the given message storage shard in response to detecting that the one or more signals indicate that the given message storage shard is overloaded.

8. An apparatus, comprising:
a client front-end component operative to receive a plurality of messaging deltas at a messaging system and queue the plurality of messaging deltas through a message queue of the messaging system, the messaging system comprising a distributed message storage system, the distributed message storage system comprising a plurality of message storage shards;
a message queue monitoring component operative to monitor the message queue to identify a plurality of batch-operation messaging deltas of the plurality of messaging deltas, wherein each messaging delta is a change in a state of the messaging system on which actions are to be taken by the messaging system and store a plurality of batch-operation instructions in a batch-operation instruction system; and
a batch-operation component of the batch-operation instruction system operative to perform the plurality of batch-operation instructions, including one or more batch-operation instructions with a selected message storage shard of the plurality of message storage shards.

9. The apparatus of claim 8, identifying the plurality of batch-operation messaging deltas based on the plurality of batch-operation messaging deltas corresponding to one or more predefined batch-operation types, the one or more predefined batch-operation types comprising one or more of a user deletion type, a message deletion type, a conversation deletion type, and a redundant archiving type.

10. The apparatus of claim 8, further comprising:
the message queue monitoring component operative to identify a message deletion command, the message deletion command specifying a range of messages in a messaging conversation; mark the message messaging conversation with the message deletion command; and store the message deletion command in the batch-operation instruction system.

11. The apparatus of claim 10, wherein marking the messaging conversation with the message deletion command is operative to prevent display of the range of messages on one or more client devices prior to the performance of the message deletion command.

12. The apparatus of claim 8, wherein user accounts of the messaging system are assigned to particular message storage shards, further comprising:

the batch-operation component operative to select a given message storage shard of the plurality of message storage shards; scan the given message storage shard to identify one or more target user accounts corresponding to one or more batch-operation instructions of the plurality of batch-operation instructions; and perform the one or more batch-operation instructions in association with the one or more target user accounts.

13. The apparatus of claim 8, further comprising:

the batch-operation component operative to receive a failure notification while performing a failed batch-operation instruction of the plurality of batch-operation instructions; and retain the failed batch-operation instruction for re-performance.

14. The apparatus of claim 8, further comprising:

the batch-operation component operative to initiate performance of one or more batch-operation instructions of the plurality of batch-operation instructions with a message storage shard of the plurality of message storage shards; detect that one or more signals indicate that the given message storage shard is overloaded, the one or more signals comprising one or more of shard error rate, shard write usage, and shard read usage; and throttle performance of the plurality of batch-operation instructions with the given message storage shard in response to detecting that the one or more signals indicate that the message storage shard is overloaded.

15. At least one non-transitory computer-readable storage medium comprising instructions that, when executed, cause a system to:

receive a plurality of messaging deltas at a messaging system, wherein each messaging delta is a change in a state of the messaging system on which actions are to be taken by the messaging system, and wherein the messaging system comprises a distributed message storage system, the distributed message storage system comprising a plurality of message storage shards;

queue the plurality of messaging deltas through a message queue of the messaging system;

monitor the message queue to identify a plurality of batch-operation messaging deltas of the plurality of messaging deltas;

store a plurality of batch-operation instructions in a batch-operation instruction system; and perform one or more batch-operation instructions of the plurality of batch-operation instructions with a selected message storage shard of the plurality of message storage shards.

16. The non-transitory computer-readable storage medium of claim 15, identifying the plurality of batch-operation messaging deltas based on the plurality of batch-operation messaging deltas corresponding to one or more predefined batch-operation types, the one or more predefined batch-operation types comprising one or more of a user deletion type, a message deletion type, a conversation deletion type, and a redundant archiving type.

17. The non-transitory computer-readable storage medium of claim 15, comprising further instructions that, when executed, cause a system to:

identify a message deletion command, the message deletion command specifying a range of messages in a messaging conversation;

mark the message messaging conversation with the message deletion command, wherein marking the messaging conversation with the message deletion command is operative to prevent display of the range of messages on one or more client devices prior to the performance of the message deletion command; and store the message deletion command in the batch-operation instruction system.

18. The non-transitory computer-readable storage medium of claim 15, wherein user accounts of the messaging system are assigned to particular message storage shards, comprising further instructions that, when executed, cause a system to:

select a given message storage shard of the plurality of message storage shards;

scan the given message storage shard to identify one or more target user accounts corresponding to one or more batch-operation instructions of the plurality of batch-operation instructions; and perform the one or more batch-operation instructions in association with the one or more target user accounts.

19. The non-transitory computer-readable storage medium of claim 15, comprising further instructions that, when executed, cause a system to:

receive a failure notification while performing a failed batch-operation instruction of the plurality of batch-operation instructions; and retain the failed batch-operation instruction for re-performance.

20. The non-transitory computer-readable storage medium of claim 15, comprising further instructions that, when executed, cause a system to:

initiate performance of one or more batch-operation instructions of the plurality of batch-operation instructions with a given message storage shard of the plurality of message storage shards;

detect that one or more signals indicate that the given message storage shard is overloaded, the one or more signals comprising one or more of shard error rate, shard write usage, and shard read usage; and throttle performance of the plurality of batch-operation instructions with the given message storage shard in response to detecting that the one or more signals indicate that the given message storage shard is overloaded.

* * * * *